United States Patent
Lee et al.

(10) Patent No.: US 11,995,910 B2
(45) Date of Patent: May 28, 2024

(54) OPTICAL SENSING MODULE AND ELECTRONIC DEVICE

(71) Applicant: InnoLux Corporation, Miao-Li County (TW)

(72) Inventors: Te-Yu Lee, Miao-Li County (TW); Yu-Tsung Liu, Miao-Li County (TW); Wei-Ju Liao, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 0 days.

(21) Appl. No.: 18/147,062

(22) Filed: Dec. 28, 2022

(65) Prior Publication Data

US 2023/0237832 A1 Jul. 27, 2023

(30) Foreign Application Priority Data

Jan. 26, 2022 (CN) .......................... 202210093415.2

(51) Int. Cl.
*G06V 40/13* (2022.01)
*G02B 3/00* (2006.01)
*G02B 5/00* (2006.01)
*G02B 27/30* (2006.01)

(52) U.S. Cl.
CPC ....... *G06V 40/1318* (2022.01); *G02B 3/0006* (2013.01); *G02B 5/005* (2013.01); *G02B 27/30* (2013.01)

(58) Field of Classification Search
None
See application file for complete search history.

(56) References Cited

U.S. PATENT DOCUMENTS

| | | | |
|---|---|---|---|
| 11,194,988 B2 | 12/2021 | Xu et al. | |
| 11,573,444 B2* | 2/2023 | Hirosawa | G06V 40/1318 |
| 11,747,665 B2* | 9/2023 | Matsunaga | G06V 40/1318 |
| | | | 345/156 |
| 2019/0183390 A1* | 6/2019 | Koda | G06T 1/20 |
| 2019/0251326 A1* | 8/2019 | Sun | H10K 59/60 |
| 2021/0089741 A1* | 3/2021 | Yeh | H10K 59/40 |
| 2021/0133420 A1* | 5/2021 | Xu | H01L 27/14627 |
| 2022/0171956 A1* | 6/2022 | Shi | H10K 50/865 |
| 2023/0177300 A1* | 6/2023 | Lee | G06V 40/1329 |
| | | | 438/106 |

FOREIGN PATENT DOCUMENTS

| | | |
|---|---|---|
| CN | 111095277 A | 5/2020 |
| TW | 202113664 A | 4/2021 |

OTHER PUBLICATIONS

Chinese language office action dated Sep. 4, 2023, issued in application TW 111135305.

\* cited by examiner

*Primary Examiner* — Joseph R Haley
(74) *Attorney, Agent, or Firm* — McClure, Qualey & Rodack, LLP

(57) ABSTRACT

An optical sensing module and an electronic device are provided. The optical sensing module includes a substrate, a plurality of optical sensing elements, and a light-blocking element. The substrate has a sensing region and a non-sensing region around the sensing region. The plurality of optical sensing elements is disposed on the sensing region. The light-blocking element is disposed on the non-sensing region and a portion of the sensing region. The light-blocking element overlaps a portion of the plurality of optical sensing elements in a normal direction of the substrate.

20 Claims, 11 Drawing Sheets

OPTICAL SENSING MODULE AND ELECTRONIC DEVICE

CROSS REFERENCE TO RELATED APPLICATIONS

This application claims the priority of China Patent Application No. 202210093415.2, filed on Jan. 26, 2022, the entirety of which are incorporated by reference herein.

TECHNICAL FIELD

The present disclosure relates to an optical sensing module and an electronic device, and, in particular, to an optical sensing module and an electronic device that include a light-blocking element.

BACKGROUND

The optical sensing module may convert the light it receives into electrical signals, and may transmit the electrical signals to a processor for analysis. Thus, optical sensing modules are widely used in consumer electronic products, such as smartphones and wearable devices.

For example, an optical sensing module may be used in a fingerprint identification device. In order to provide consumers with a positive user experience, the fingerprint identification device must meet certain requirements, including high security, high convenience and/or high accuracy. However, current optical sensing modules can be affected by stray light, such as external light. This may generating noise, which reduces the identification accuracy of the electrical signal.

Therefore, although existing optical sensing modules and electronic devices have generally met their intended purposes, they have not been completely satisfactory in all respects. There are still some problems to be overcome regarding optical sensing modules and electronic devices.

SUMMARY

An embodiment of the present disclosure provides an optical sensing module. The optical sensing module includes a substrate, a plurality of optical sensing elements, and a light-blocking element. The substrate has a sensing region and a non-sensing region around the sensing region. The plurality of optical sensing elements is disposed on the sensing region. The light-blocking element is disposed on the non-sensing region and a portion of the sensing region. Wherein, the light-blocking element overlaps a portion of the plurality of optical sensing elements in a normal direction of the substrate.

An embodiment of the present disclosure provides an electronic device. The electronic device includes a display panel and an optical sensing module. The optical sensing module is disposed on a side of the display panel. The optical sensing module includes a substrate, a plurality of optical sensing elements, and a light-blocking element. The substrate has a sensing region and a non-sensing region around the sensing region. The plurality of optical sensing elements is disposed on the sensing region. The light-blocking element is disposed on the non-sensing region and a portion of the sensing region. Wherein, the light-blocking element overlaps a portion of the plurality of optical sensing elements in a normal direction of the substrate.

The optical sensing module of the present disclosure may be applied in various types of electronic devices including display panel. In order to make the features and advantages of the present disclosure more understand, some embodiments of the present disclosure are listed below in conjunction with the accompanying drawings, and are described in detail as follows.

BRIEF DESCRIPTION OF THE DRAWINGS

With the following detailed description in conjunction with the accompanying drawings, we can better understand the viewpoints of the embodiments of the present disclosure. It should be noted that, according to the standard practice in the industry, the various features are not drawn to scale. In fact, the dimensions of the various features may be arbitrarily increased or reduced for clarity.

DETAILED DESCRIPTION

Figure 1A:
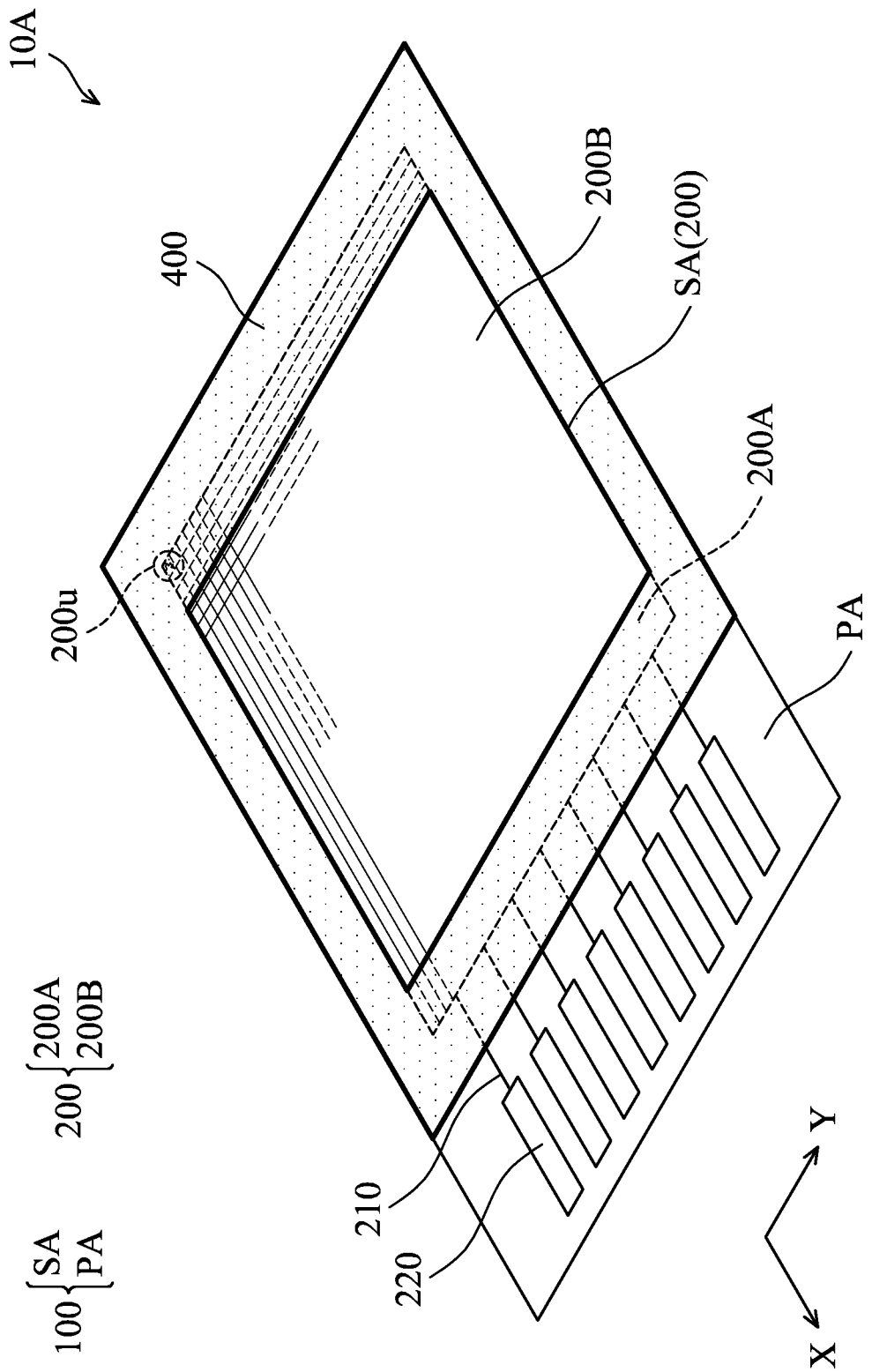
FIG. 1A shows a schematic top view of an optical sensing module according to some embodiments of the present disclosure.

The following disclosure provides many different embodiments or examples for implementing different features of optical sensing modules and electronic devices disclosed herein. Specific examples of each feature and its configuration are described below to simplify the embodiments of the present disclosure. Naturally, these are examples and are not intended to limit the present disclosure. For example, if the description mentions that the first feature is formed on the second element, it may include an embodiment in which the first feature and second feature are in direct contact, or may include an embodiment in which additional feature is formed between the first feature and the second feature thereby the first feature and the second feature do not directly contact. Furthermore, the embodiments of the present disclosure may repeat reference numerals and/or characters in different examples. This repetition is for brevity and clarity and is not intended to represent a relationship between the different embodiments and/or aspects discussed herein.

Orientation terms discussed herein, such as "up", "down", "front", "rear", "left", "right", and the like, are only referring to the direction of the drawings. Accordingly, the used orientation terms are intended to illustrate rather than limit the disclosure.

In some embodiments of the present disclosure, terms related to bonding and connection, such as "connect", "interconnect", and the like, unless otherwise defined, may refer to two structures in direct contact, or they may refer to two structures that are not in direct contact, there being another structure disposed between the two structures. Terms related to bonding and connection may also include embodiments in which both structures are movable, or both structures are fixed. Furthermore, the terms "electrically connect" or "electrically couple" include direct and indirect means of electrical connection.

In addition, the "first", "second", and the like mentioned in the specification or claims are used to name different elements or distinguish different embodiments or scopes and are not used to limit the upper limit or lower limit of the number of the elements and are not used to limit the manufacturing order or the arrangement order of the elements.

Hereinafter, the terms "about", "substantially", and the like generally mean within 10%, within 5%, within 3%, within 2%, within 1%, or within 0.5% of a given value or range. The given value is an approximate value, that is, "about", "substantially", and the like may still be implied without the specific description of "about", "substantially", and the like.

Unless otherwise defined, all terms (including technical and scientific terms) used herein have the same meaning as commonly understood by a person of ordinary skills in the art. It should be understand that these terms, such as those defined in commonly used dictionaries, should be interpreted as having meanings consistent with the relevant art and the background or context of the present disclosure, and should not be interpreted in an idealized or overly formal manner, unless otherwise defined in the embodiments of the present disclosure.

Some variations of the embodiments are described below. Similar reference numerals are used to designate similar elements in the different drawings and illustrated embodiments. It will be appreciated that additional operations may be provided before, during, and after the method, and that some of the described operations may be replaced or deleted for other embodiments of the method.

Herein, the respective directions are not limited to three axes of the rectangular coordinate system, such as the X-axis, the Y-axis, and the Z-axis, and may be interpreted in a broader sense. For example, the X-axis, the Y-axis, and the Z-axis may be perpendicular to each other, or may represent different directions that are not perpendicular to each other. For convenience of description, hereinafter, the X-axis direction is the length direction, the Y-axis direction is the width direction, and the Z-axis direction is the thickness direction. In an embodiment of the present disclosure, the Z-axis direction is the normal direction of the substrate.

In some embodiments, the electronic device may include a display device, a back light device, an antenna device, a sensing device, a tiled device, a touch display, a curved display and/or a free shape display, but the present disclosure is not limited thereto. The electronic device may be a foldable or flexible electronic device. The electronic device may include light-emitting diode, fluorescence, phosphor, another suitable display media, or some combination of the materials listed above, but it is not limited thereto. The display device may be a non-self-luminous display device, or a self-luminous display device. The antenna device may be an liquid crystal antenna device, or a non-liquid crystal antenna device, but it is not limited thereto. The sensing device may be a sensing device for sensing capacitance, light, heat, or ultrasonic waves, but the present disclosure is not limited thereto. The sensing device may include a fingerprint sensing device, a visible light sensing device, an infrared light sensing device, and an X-ray sensing device, but it is not limited thereto. The electronic element may include passive elements and active elements, such as capacitors, resistors, inductors, diodes, transistors, and the like. The diodes may include light-emitting diodes or photodiodes. The light-emitting diodes may include, for example, organic light-emitting diodes (OLEDs), mini light-emitting diodes (mini LEDs), micro light-emitting diodes (micro LEDs), or quantum dot light-emitting diodes (quantum dot LED), another suitable material, or some combination of the materials listed above, but it is not limited thereto. The tiled module may be, for example, a display tiled module or an antenna tiled module, but the present disclosure is not limited thereto. It should be noted that, the electronic device may be any arrangement and combination of the foregoing, but the present disclosure is not limited thereto. In addition, the shape of the electronic device may be rectangular, circular, polygonal, a shape with curved edges, or another suitable shape. The electronic device may have a peripheral system, such as a processing system, a driving system, a control system, a light source system, a shelf system, or the like to support the display device or the tiled device.

Referring to FIG. 1A, it shows a schematic top view of an optical sensing module 10A according to some embodiments of the present disclosure. It should be understood that some elements of the optical sensing module 10A are omitted in the drawings, and only some elements are schematically shown for clarity. In some embodiments, additional components may be added to the optical sensing module 10A described below. In other embodiments, some components of the optical sensing module 10A described below may be replaced or omitted. Furthermore, the structure of the optical sensing module 10A will be described below in conjunction with the formation method of the optical sensing module 10A. It should be understood that, in some embodiments, additional operations may be provided before, during, and/or after the method of forming the optical sensing module 10A. In some embodiments, some of the described operations may be replaced or omitted, and the order of some of the described operations may be interchangeable.

As shown in FIG. 1A, in some embodiments, the optical sensing module 10A includes a substrate 100. In some embodiments, the substrate 100 may include a flexible substrate, a rigid substrate, or a combination thereof, but it is not limited thereto. In some embodiments, the substrate 100 may include glass, quartz, sapphire, ceramic, polyimide (PI), polycarbonate (PC), polyethylene terephthalate (PET), polypropylene (PP), another suitable material or a combination thereof, but it is not limited thereto. In some embodiments, the substrate 100 may include a metal-glass fiber composite sheet, or a metal-ceramic composite sheet, but it is not limited thereto. In some embodiments, the substrate 100 may include a transparent substrate, a semi-transparent substrate, or an opaque substrate.

In some embodiments, the substrate 100 may include a sensing region SA and a non-sensing region PA around the sensing region SA. In some embodiments, the non-sensing region PA may surround the sensing region SA. In some embodiments, the non-sensing region PA may completely surround the sensing region SA. In other embodiments, the non-sensing region PA may expose a portion of the edge of the sensing region SA. In some embodiments, an optical sensing layer 200 may be disposed on the sensing region SA. In some embodiments, a region of the substrate 100 which the optical sensing layer 200 is disposed thereon is the sensing region SA. In some embodiments, a region of the substrate 100 which the optical sensing layer 200 is not disposed thereon is the non-sensing region SA.

In some embodiments, the optical sensing layer 200 may include a plurality of optical sensing elements 200$u$. In some embodiments, the optical sensing element 200$u$ may be any element capable of converting an optical signal into an electrical signal. The optical sensing element may include, for example, a photodiode, a phototransistor, a metal-semiconductor-metal photodetector (MSM photodetector), or any suitable optical sensing element, but it is not limited thereto. In some embodiments, the plurality of optical sensing elements 200$u$ may be arranged in an array or a matrix. In some embodiments, the optical sensing element 200$u$ may include a first doped layer (not shown), an intrinsic layer (not shown), a second doped layer (not shown), and a transparent conductive layer (not shown) that are sequentially arranged. In some embodiments, when a light irradiates the optical sensing element 200$u$, an electron-hole pairs may be generated to form a photocurrent, but it is not limited thereto. In some embodiments, the first doped layer may be, for example, an N-type doping region, and the second doped layer may be, for example, a P-type doping region, and together with the intrinsic layer, thereby forming a N-I-P structure. Therefore, the optical sensing element 200$u$ may have the N-I-P structure. In other embodiments, the optical sensing element 200$u$ may have a P-I-N structure or other suitable structures.

In some embodiments, the first doped layer, the intrinsic layer, and the second doped layer may include semiconductor materials, for example, silicon or another suitable material. In some embodiments, the first doped layer, the intrinsic layer, and/or the second doped layer may be formed by an epitaxial growth process, an ion implantation process, a chemical vapor deposition process, a physical vapor deposition process, another suitable process, or a combination thereof. In some embodiments, the transparent conductive layer may include a transparent conductive material, for example, may include transparent conductive oxide (TCO). The transparent conductive oxide may include indium tin oxide (ITO), antimony zinc oxide (AZO), tin oxide (SnO), zinc oxide (ZnO), indium zinc oxide (IZO), indium gallium zinc oxide (IGZO), indium tin zinc oxide (ITZO), antimony tin oxide (ATO), another suitable transparent conductive material or a combination thereof, but it is not limited thereto.

In some embodiments, a transmission line 210 and a bonding pad 220 may be disposed on the non-sensing region PA of the substrate 100, and the transmission line 210 may electrically connect the bonding pad 220 and the optical sensing element 200$u$ on the sensing region SA. In some embodiments, the transmission lines 210 and the bonding pads 220 may be disposed adjacent to multiple sides of the sensing region SA base on the size of the non-sensing region PA.

In some embodiments, the transmission lines 210 and/or the bonding pads 220 may include metal materials, transparent conductive materials, another suitable conductive material, or a combination thereof, but are not limited thereto. In some embodiments, the metal material may include, for example, copper (Cu), silver (Ag), gold (Au), tin (Sn), aluminum (Al), molybdenum (Mo), tungsten (W), chromium (Cr), nickel (Ni), platinum (Pt), titanium (Ti), alloys of the foregoing metals, another suitable material or a combination thereof, but it is not limited thereto. The transparent conductive material may include a transparent conductive oxide. The transparent conductive oxide may include indium tin oxide, antimony zinc oxide, tin oxide, zinc oxide, indium zinc oxide, indium gallium zinc oxide, indium tin zinc oxide, antimony tin oxide, another suitable transparent conductive material, or a combination thereof, but it is not limited thereto. According to some embodiments, the transmission lines 210 and/or the bonding pads 220 may be formed by a chemical vapor deposition process, a physical vapor deposition process, an electroplating process, an electroless plating process, another suitable process, or a combination thereof.

Figure 4:
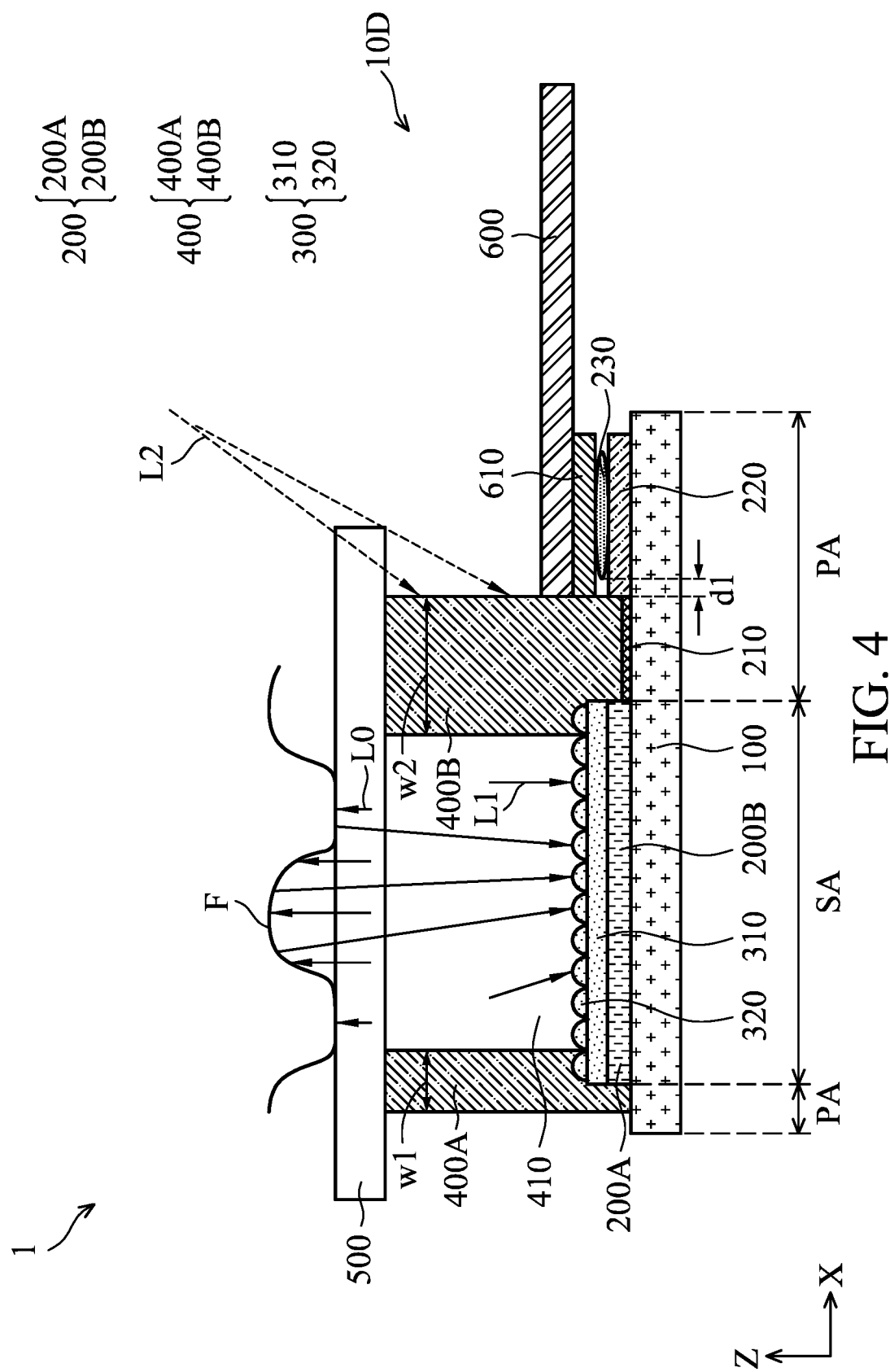
FIG. 4 shows a schematic cross-sectional view of an electronic device according to some embodiments of the present disclosure.

As shown in FIG. 1A, in some embodiments, the light-blocking element 400 may be disposed on the non-sensing region PA and a portion of the sensing region SA. Therefore, an undesired light may be blocked by the light-blocking element 400. In some embodiments, the light-blocking element 400 may be disposed on the optical sensing element 200$u$, and the optical sensing element 200$u$ may be interposed between the light-blocking element 400 and the substrate 100. In some embodiments, the light-blocking element 400 overlaps a portion of the optical sensing layer 200 in the normal direction (Z direction) of the substrate 100 (as shown in FIG. 4). Therefore, a plurality optical sensing elements 200$u$ in an overlapping portion 200A of the optical sensing layer 200 cannot receive optical signals. Although the plurality of optical sensing elements 200$u$ in the overlapping portion 200A can still perform the optical sensing function, no detectable optical signals may be received by the plurality of optical sensing elements 200$u$. In other words, the plurality of optical sensing elements 200$u$ in the overlapping portion 200A of the optical sensing layer 200 may have dark state signals. In some embodiments, in order to enable at least a portion of the plurality (at least some) of optical sensing elements 200$u$ to perform the optical sensing function, the light-blocking element 400 may expose another portion of the optical sensing layer 200. The light-blocking element 400 overlaps a portion of the plurality of optical sensing elements 200$u$ in the normal direction of the substrate 100 and exposes another portion of the plurality of optical sensing elements 200$u$. (That is, the light-blocking element 400 overlaps some of the optical sensing elements 200$u$ in the normal direction of the substrate 100 and exposes some of the other optical sensing elements 200$u$.) In some embodiments, the light-blocking element 400 exposes a non-overlapping portion 200B of the optical sensing layer 200. Therefore, a plurality of optical sensing elements 200$u$ in the non-overlapping portion 200B of the optical sensing layer 200 can receive the optical signals, and thus can perform the optical sensing function. In other words, the plurality of optical sensing elements 200$u$ in the non-overlapping portion 200B of the optical sensing layer 200 have a combined signal, which is a combination of a dark state signal and a light signal.

In some embodiments, when the light-blocking element 400 is disposed on one side of the sensing region SA, the undesired light irradiated to the other side of the sensing region SA may be blocked by other components formed subsequently. For example, the light irradiated on other sides of the sensing region SA may be blocked by a subsequently formed flexible circuit board. In some embodiments, the light-blocking element 400 may be disposed on some sides of the sensing region SA, and not disposed on the remaining side of the sensing region SA. In some embodiments, the light-blocking element 400 may be disposed on all sides of the sensing region SA, that is, the light-blocking element 400 may surround the sensing region SA.

In some embodiments, the light-blocking element 400 may have a closed shape structure. In some embodiments, the light-blocking element 400 may be a ring-shaped structure, a frame-shaped structure, or a polygonal structure with a hollow portion, another suitable structure, or a combination thereof. In other embodiments, the light-blocking element 400 may be a non-closed shape structure, such as a U-shaped structure, an L-shaped structure, a linear structure, another suitable structure, or a combination thereof. In some embodiments, the light-blocking element 400 may be a structure having any shape, wherein the structure may overlap the overlapping portion 200A of the optical sensing layer 200 and expose the non-overlapping portion 200B of the optical sensing layer 200.

In some embodiments, the shape of the overlapping portion 200A of the optical sensing layer 200 may correspond to the shape of a portion of the light-blocking element 400. For example, as shown in FIG. 1A, when the light-blocking element 400 has a ring-shaped structure, the shape of the overlapping portion 200A of the optical sensing layer 200 may include two rectangles in which the extending directions of the two rectangles are parallel. That is, the shape of the overlapping portion 200A of the optical sensing layer 200 corresponds to the shape of the opposite sides of the light-blocking element 400. In other embodiments, the shape of the overlapping portion 200A of the optical sensing layer 200 may correspond to the shape of the light-blocking element 400. For example, when the light-blocking element 400 has an ring-shaped structure, the shape of the overlapping portion 200A of the optical sensing layer 200 may be ring-shaped.

In some embodiments, at least one optical sensing element 200u may be disposed in the overlapping portion 200A of the optical sensing layer 200. In some embodiments, when the optical sensing elements 200u are arranged in an array, at least one row or at least one column of the optical sensing elements 200u may be disposed in the overlapping portion 200A. In some embodiments, at least three rows or at least three columns of the optical sensing elements 200u may be disposed in the overlapping portion 200A, so that at least three rows or at least three columns of pixels are shielded by the light-blocking elements 400. Thus, the process tolerance of the formation of light-blocking elements 400 on the optical sensing element 200u may be increased thereby reducing the error in forming the light-blocking element 400 and increasing the yield of the optical sensing module. In addition, if at least three rows or at least three columns of pixels are shielded by the light-blocking element 400, more dark state signals may be obtained as the basis for subsequent image processing. For example, if at least three rows of optical sensing element 200u are shielded by the light-blocking element 400, the dark state signals of the first row of optical sensing elements 200u, the dark state signals of the second row of optical sensing elements 200u, and the dark state signals of the third row of optical sensing elements 200u may be obtained. According to the requirements, the dark state signals of the first row of optical sensing elements 200u, the dark state signals of the second row of optical sensing elements 200u, or the dark state signals of the third row of optical sensing elements 200u may be used as the basis for subsequent image processing. As shown in FIG. 1A, the light-blocking element 400 shields the three rows of optical sensing elements 200u on opposite sides.

As shown in FIG. 1A, in some embodiments, the light-blocking element 400 may be disposed on the transmission line 210. In some embodiments, the light-blocking element 400 may be disposed on a portion of the bonding pad 220 and expose another portion of the bonding pad 220 so that the bonding pad 220 may be electrically connected with other components.

In some embodiments, the light-blocking element 400 may include resin, photoresist material, another suitable light-blocking material, or a combination thereof, but it is not limited thereto. In some embodiments, the light-blocking element 400 may be a black matrix, a black glue, or a black photoresist material. In some embodiments, a light absorption rate of the light-blocking element 400 is greater than 80%. For example, the absorption rate of the light-blocking element 400 is greater than 90%, 95%, 99%, 99.9%, 99.99% or any value between the aforementioned values, but it is not limited thereto. Therefore, in the case where the light-blocking element 400 has a high absorption rate, light may be absorbed.

In some embodiments, the light-blocking element 400 may be formed on the optical sensing element 200u by a bonding process, a coating process, a deposition process, another suitable process, or a combination thereof. In some embodiments, the light-blocking element 400 itself may include an adhesive material to facilitate connection with other components of the electronic device, thereby shortening the process period and/or reducing the process cost. In some embodiments, the light-blocking element 400 may further include an adhesive layer (not shown), and light-blocking element 400 may be connected with other components by the adhesive layer. In some embodiments, the adhesive layer may include a photocurable adhesive, a thermally curable adhesive, a photothermally curable adhesive, another suitable material, or a combination thereof, but it is not limited thereto. For example, in some embodiments, the adhesive layer may include an optical clear adhesive (OCA), an optical clear resin (OCR), a pressure sensitive adhesive (PSA), another suitable material or a combination thereof, but it is not limited thereto.

Figure 1B:
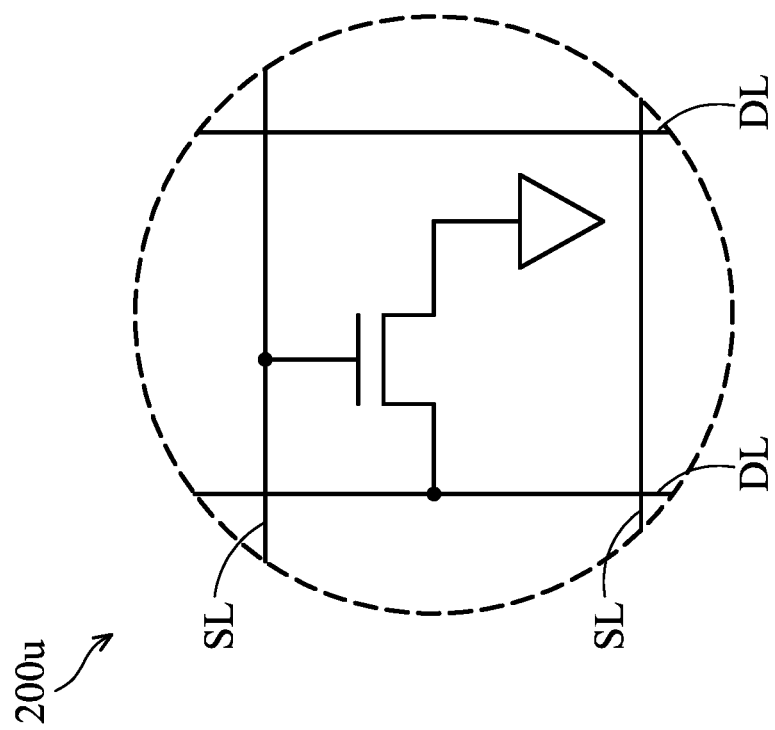
FIG. 1B shows an equivalent circuit diagram of an optical sensing element of an optical sensing module according to some embodiments of the present disclosure.

Referring to FIG. 1B, it shows an equivalent circuit diagram of an optical sensing element 200u of an optical sensing module according to some embodiments of the present disclosure. In some embodiments, the optical sensing element 200u may include transistors and diodes. In some embodiments, the transistors in the optical sensing element 200u may be electrically connected to a date line DL and a scan line SL. In some embodiments, the transistors in the optical sensing element 200u may be thin film transistors. In some embodiments, the thin film transistor may include a top gate thin film transistor, a bottom gate thin film transistor, a dual gate (double gate) thin film transistor, or a combination thereof, but it is not limited thereto. In some embodiments, the thin film transistor may include at least one semiconductor layer, a gate dielectric layer, and a gate electrode layer. In some embodiments, the material of the semiconductor layer may include an amorphous silicon, a polysilicon, or a metal oxide, but it is not limited thereto. In some embodiments, the diodes may be photodiodes that convert optical signals into electrical signals.

For the sake of brevity, the same or similar descriptions are not described hereinafter.

Figure 2:
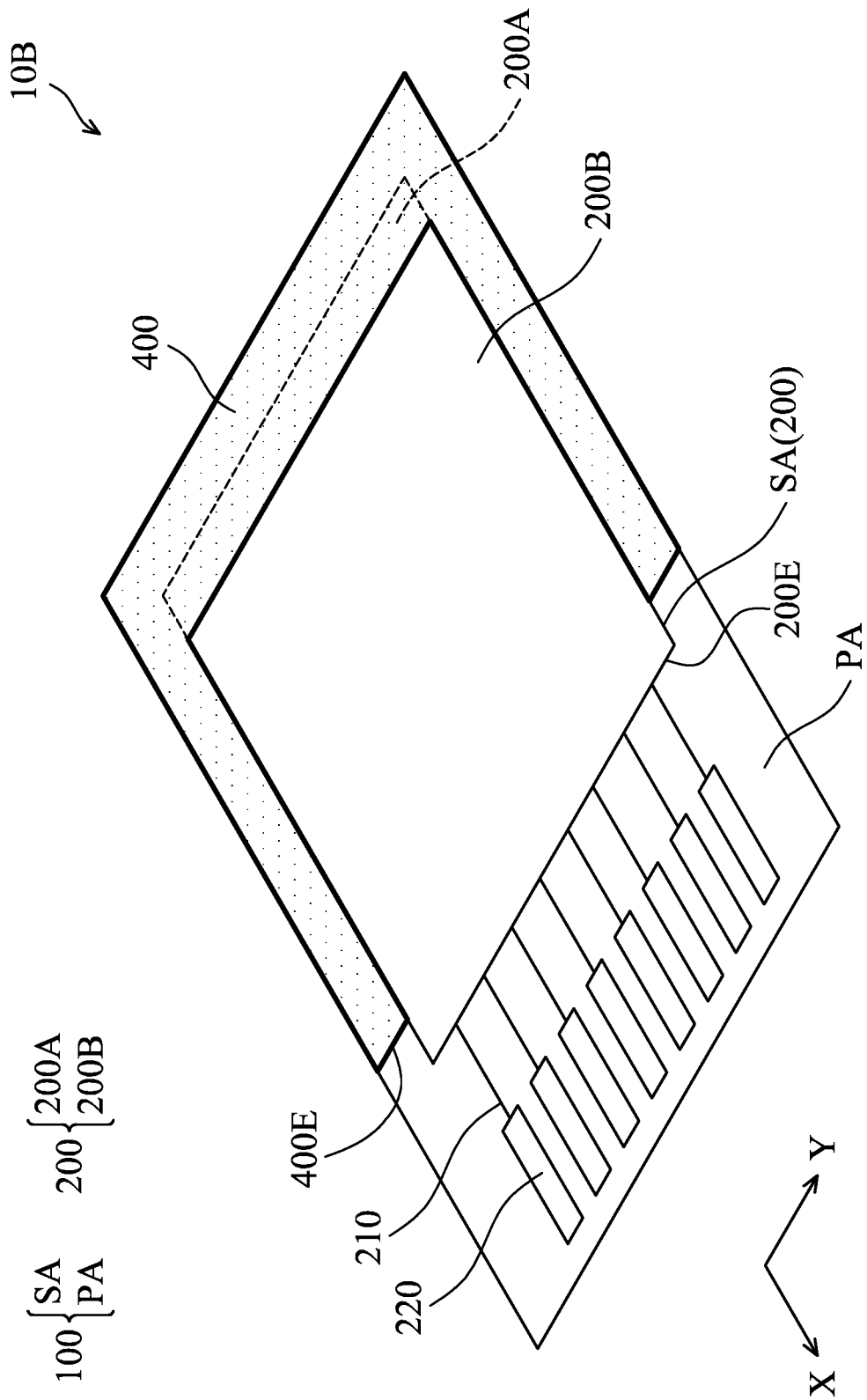
FIG. 2 shows a schematic top view of an optical sensing module according to some embodiments of the present disclosure.

Referring to FIG. 2, it shows a schematic top view of the optical sensing module 10B according to some embodiments of the present disclosure. In some embodiments, the light-blocking element 400 may have a (upside down) U-shaped structure. The U-shaped structure may have an opening, and the transmission line 210 and the bonding pad 220 are exposed by the opening. In some embodiments, the edge 400E of the light-blocking element 400 is further away from the transmission line 210 than the edge 200E of the optical sensing layer 200. In other embodiments, the edge 400E of the light-blocking element 400 is closer to the transmission line 210 than the edge 200E of the optical sensing layer 200.

Figure 3:
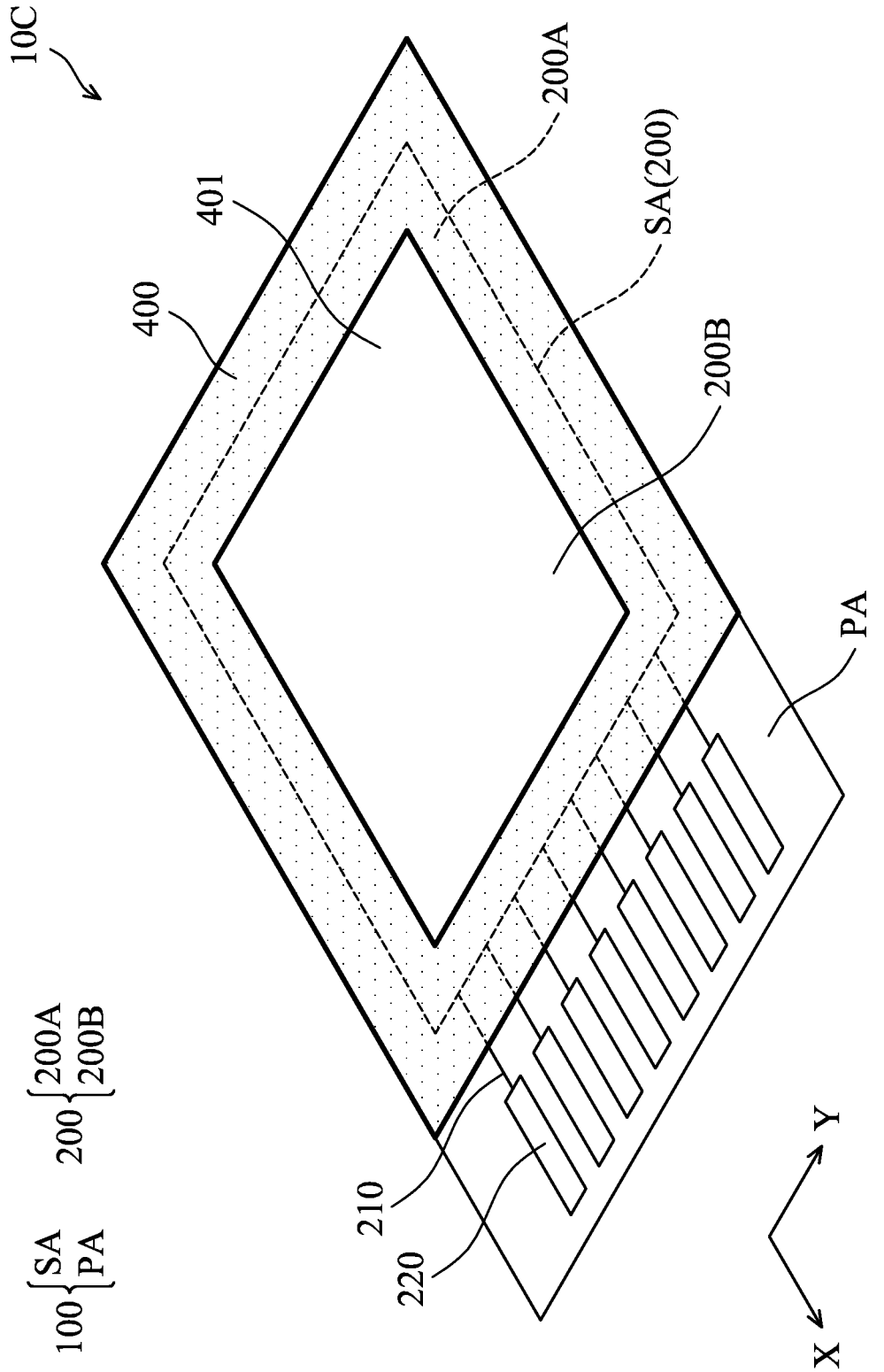
FIG. 3 shows a schematic top view of an optical sensing module according to some embodiments of the present disclosure.

Referring to FIG. 3, it shows a schematic top view of the optical sensing module 10C according to some embodiments of the present disclosure. In some embodiments, the light-blocking element 400 may be a frame-shaped structure. The frame-shaped structure surrounds the sensing region SA. In some embodiments, the frame-shaped structure has an opening 401, and the non-overlapping portion 200B of the optical sensing layer 200 is exposed by the opening 401. In some embodiments, the overlapping portion 200A of the optical sensing layer 200 is frame-shaped. In some embodiments, the light-blocking element 400 is disposed on the transmission line 210. The light-blocking element 400 overlaps the transmission line 210 in the normal direction of the substrate 100.

In subsequent FIGS. 4 to 9, schematic cross-sectional views of electronic devices 1 to 6 according to some embodiments of the present disclosure are respectively shown. In some embodiments, the electronic device 1, 2, 3, 4, 5 or 6 may include the aforementioned optical sensing module 10A, 10B or 10C or a combination thereof, but it is not limited thereto. In the following, according to any combination of the foregoing embodiments, the optical sensing module 10D included in the electronic device 1, the optical sensing module 10E included in the electronic device 2, the optical sensing module 10F included in the electronic device 3, the optical sensing module 10G included in the electronic device 4, the optical sensing module 10H included in the electronic device 5, and the optical sensing module 10I included in the electronic device 6 are shown.

Referring to FIG. 4, it shows a schematic cross-sectional view of the electronic device 1 according to some embodiments of the present disclosure.

As shown in FIG. 4, the electronic device 1 may include an optical sensing module 10D. In some embodiments, the optical sensing module 10D may further include a flexible circuit board 600 and bonding pads 610 of the flexible circuit board 600. In some embodiments, the flexible circuit board 600 is electrically connected to the bonding pads 220. Specifically, the flexible circuit board 600 is electrically connected to the bonding pads 220 on the substrate 100 by the bonding pads 610 and the connecting members 230. In some embodiments, a portion of the flexible circuit board 600 is disposed on the non-sensing region PA of the substrate 100. In some embodiments, since the connecting member 230 may be bonded or/and attached to the bonding pad 220 and the bonding pad 610, a side edge of the bonding pad 610 and a side edge of the connecting member 230 may be spaced with a first distance d1. Thus, the absorption of water vapor caused by the connection element 230 exposed to the air thereby affecting the signal transmission function may be reduced. In some embodiments, an air gap may be disposed adjacent to the light-blocking element 400. In some embodiments, an air gap may be formed between the light-blocking element 400, the bonding pads 220, the connecting members 230 and the bonding pads 610.

In some embodiments, the flexible circuit board 600 may be a flexible printed circuit board (FPC) or a chip on film (COF). In some embodiments, the connecting member 230 may be an anisotropic conductive film (ACF).

In some embodiments, the flexible circuit board 600 may be bonded on the substrate 100, so that the flexible circuit board 600 and the optical sensing layer 200 are electrically connected. Then, the light-blocking element 400 may be formed on the substrate 100, so that the light-blocking element 400 may be disposed around and/or above the flexible circuit board 600. In this embodiment, since the flexible circuit board 600 has been bonded onto the substrate 100, the light-blocking efficiency may be improved after the light-blocking element 400 is further formed. In other embodiments, the light-blocking element 400 may be formed on the substrate 100, and then the flexible circuit board 600 and the optical sensing layer 200 are electrically connected to each other by bonding the bonding pads 220 and the bonding pads 610. Therefore, the risk of damage to the flexible circuit board 600 caused by the process of forming the light-blocking element 400 is reduced.

In some embodiments, the light-blocking element 400 overlaps the flexible circuit board 600 in the normal direction (Z direction) of the substrate 100. The light-blocking element 400 is interposed between the flexible circuit board 600 and the substrate 100. In some embodiments, the light-blocking element 400 does not overlap the flexible circuit board 600 in the normal direction of the substrate 100. The light-blocking element 400 may be in contact with the flexible circuit board 600. In some embodiments, one side edge of the light-blocking element 400 and one end of the transmission line 210 may be substantially aligned.

As shown in FIG. 4, in some embodiments, when viewed in a cross-sectional view, the light-blocking element 400 may include a light-blocking portion (first light-blocking portion) 400A and a light-blocking portion (second light-blocking portion) 400B. The light-blocking portion 400A and the light-blocking portion 400B may be substantially continuous or substantially independent. In some embodiments, the light-blocking portion 400A has a first width w1 and the light-blocking portion 400B has a second width w2. The first width w1 may be different from the second width w2. In some embodiments, the first width w1 may be greater or smaller than the second width w2, but it is not limited thereto. In some embodiments, since the light-blocking element 400 may have a greater width, the light-blocking effect may be improved and/or the display device may be provided with better supporting force. In some embodiments, the second width w2 of the light-blocking portion 400B is greater than the first width w1 of the light-blocking portion 400A, thereby reducing the possibility that the internal circuit structure (not shown) is irradiated by the second light L2 to affect the electrical properties. Or, forming the light-blocking portion 400B first may disperse the pressure of the bonding process on the transmission line 210 so as to reduce the possibility of damage to the transmission line 210.

As shown in FIG. 4, the flexible circuit board 600 may be disposed on the light-blocking portion 400B. The light-blocking portion 400B is disposed between the flexible circuit board 600 and (the optical sensing elements 200u of) the optical sensing layer 200 to block the second light L2 such as noise light from entering the optical sensing layer 200. In some embodiments, the light-blocking portion 400B has a protruding portion extending toward the flexible circuit board 600.

In some embodiments, in conjunction with FIGS. 2 and 4, in the case where the light-blocking element 400 has a U-shaped structure exposing the transmission line 210 and the bonding pad 220. For example, in the cross-sectional view, there is the light-blocking portion 400A without the light-blocking portion 400B. The flexible circuit board 600 may be disposed on the transmission line 210 and the bonding pad 220, so that a portion of the second light L2 is blocked by the flexible circuit board 600, and the remaining portion of the second light L2 is blocked by the light-blocking portion 400A. In other words, the light-blocking element 400 and the flexible circuit board 600 may block the second light L2 individually or collectively. In some embodiments, since the flexible circuit board 600 has a thickness in the Z direction, a portion of the second light L2 may be blocked by the flexible circuit board 600.

As shown in FIG. 4, in some embodiments, the optical sensing module 10D may further include an optical assembly 300 disposed on the optical sensing elements. In some embodiments, the optical assembly 300 may include a light collimation structure 310 and microlenses 320 disposed on the light collimation structure 310. In some embodiments, the light collimation structure 310 may be interposed between the optical sensing layer 200 and the microlenses 320. In some embodiments, the light collimation structure 310 may include a conductive layer, a dielectric layer, a light-blocking layer such as a black matrix, a transmissive layer, another suitable layer, or a combination thereof, but it is not limited thereto. In some embodiments, the light-blocking element 400 is disposed on the optical assembly 300, and the optical assembly 300 is interposed between the light-blocking element 400 and the optical sensing layer 200.

In some embodiments, the light collimation structure 310 may include a conductive layer and a plurality of light-blocking layers sequentially disposed on the optical sensing layer 200. In some embodiments, the conductive layer may be electrically connected to the optical sensing layer 200. In some embodiments, each light-blocking layer has a different-sized opening, and the openings in the light-blocking layers overlap in the normal direction (Z direction) of the substrate 100, and the sizes of the openings gradually decrease towards the substrate 100 (in the direction opposite to the Z direction) to achieve the effect of light collimation. The light-blocking layers may absorb light reflected by the conductive layer or the light reflected back and forth between the conductive layers, so as to achieve the effect of anti-reflection or reduction of light noise. The light-blocking layer may also block light from a large angle, so as to reduce the signal-to-noise ratio (SNR). A functional layer such as a dielectric layer or a planarization layer may be disposed between the conductive layer and the plurality of light-blocking layers. In some embodiments, the microlenses 320 and the openings in the light-blocking layers overlap in the normal direction of the substrate 100, and the microlenses 320 help to focus light into a specific region (for example, into the optical sensing element 200u of the optical sensing layer 200). In some embodiments, a portion of the optical sensing element 200u is disposed at the portion illuminated by the light collected by the microlens 320, and another portion of the optical sensing element 200u is shielded by the light-blocking element 400, thereby reducing the influence of photocurrent in the optical sensing element 200u by the stray capacitance, which may improve the sensitivity of the optical sensing element and/or enhance the overall performance of the optical sensing module.

In some embodiments, a plurality of microlenses 320 are provided, and each of the microlenses 320 corresponds to one optical sensing element 200u. In other embodiments, a portion of the optical sensing element 200u is not provided with the light collimation structure 310 and the microlens 320. Specifically, the optical sensing element 200u disposed in the overlapping portion 200A of the optical sensing layer 200 is not provided with the light collimation structure 310 and the microlens 320 to reduce the process cost (referring to FIG. 5).

As shown in FIG. 4, in some embodiments, the display device may include a display panel 500. In some embodiments, the display panel 500 may include, for example, a liquid crystal display panel, a light-emitting diode display panel, such as an inorganic light-emitting diode display panel, an organic light-emitting diode display panel, a mini light-emitting diode display panel, micro light-emitting diode display panel, or quantum dot light-emitting diode display panel, but it is not limited thereto.

In some embodiments, the optical sensing module 10D may be disposed under the display panel 500. In some embodiments, the optical sensing module 10D may be fixed under the display panel 500 by an adhesive layer (not shown). In some embodiments, the adhesive layer may include a photocurable adhesive, a thermally curable adhesive, a photothermally curable adhesive, another suitable material, or a combination thereof, but it is not limited thereto. For example, in some embodiments, the adhesive layer may include an optical clear adhesive, an optical clear resin, a pressure sensitive adhesive, another suitable material, or a combination thereof, but it is not limited thereto. In some embodiments, as mentioned above, since the light-blocking element 400 may include an adhesive material, the display panel 500 and the optical sensing module 10D may be connected by the light-blocking element 400 in the optical sensing module 10D.

As shown in FIG. 4, in some embodiments, a light L0 emitted by the display panel 500 is reflected by a fingerprint F on the finger to generate a reflected light, and the optical sensing module 10D receives at least a portion of the reflected light as the first light L1. The first light L1 may be incident into the optical sensing module 10D, so that the optical sensing module 10D senses the touch of the finger, thereby converting the optical signal into an electrical signal for identification and analysis by the corresponding processor.

In some embodiments, the second light L2 may include light irradiated outside the sensing region SA. The second light L2 may include, for example, an external light, an ambient light, a noise light, or other light that is not intended to be sensed. In some embodiments, the light-blocking element 400 may block the second light L2 from entering the optical sensing module 10D. Specifically, the light-blocking element 400 blocks the reflected light or diffracted light generated after the second light L2 is irradiated on the substrate 100 or a stacked structure on the substrate 100 from entering the sensing region SA. The second light L2 may interfere with the optical sensing layer 200 and cause subsequent imaging degradation. Therefore, the present disclosure reduces the possibility that the second light L2 directly or indirectly interferes with the optical sensing layer 200 by disposing the light-blocking element 400, so as to improve the accuracy of the optical sensing module 10D.

In some embodiments, the optical sensing module 10D may receive all the reflected light generated by the display panel 500 as the first light L1. In other embodiments, the optical sensing module 10D receives a portion of the reflected light as the first light L1, and the light not received by the optical sensing module 10D may become a portion of the second light L2. In other words, because the light not received by the optical sensing module 10D may be reflected on the substrate 100 or reflected and/or diffracted back and forth between the stacked structure on the substrate 100 to generate noise light, the light reflected outside the sensing region SA after the display panel 500 illuminates the finger also belongs to noise light. Even if there is no external light when the electronic device 1 is used, the undesired second light L2 may still be generated due to the light L0 emitted by the display panel 500.

In some embodiments, since the optical sensing module 10D is disposed below the display panel 500, there may be a cavity 410 between the optical sensing module 10D and the display panel 500. In some embodiments, the light-blocking element 400, the optical assembly 300, and the display panel 500 may form the cavity 410. In some embodiments, the cavity 410 may be filled with an organic material. In some embodiments, the cavity 410 may be an air gap. The gas in the cavity 410 may be air, inert gas, another suitable gas, or a combination thereof.

For the sake of brevity, the same or similar descriptions are not described hereinafter.

Figure 5:
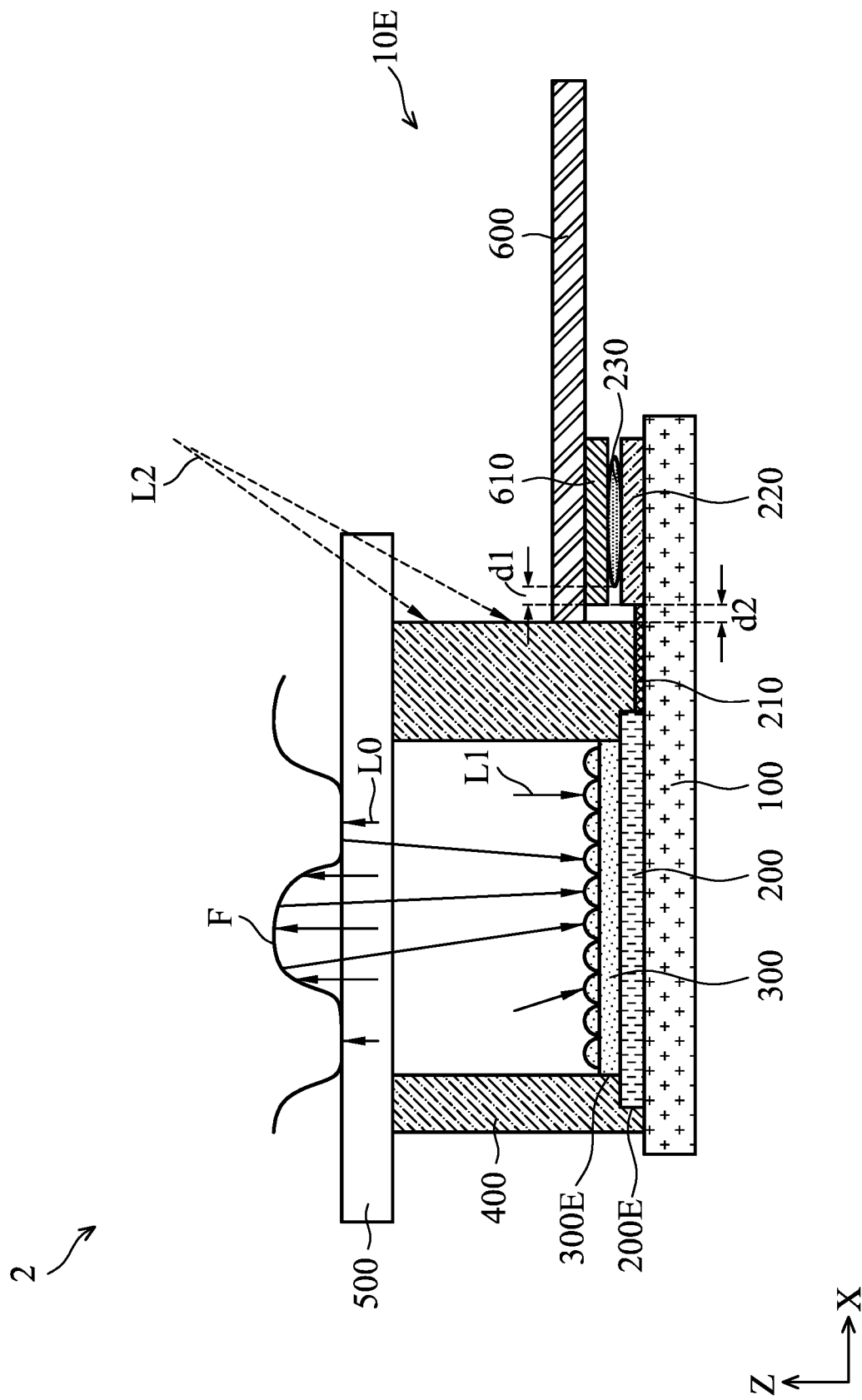
FIG. 5 shows a schematic cross-sectional view of an electronic device according to some embodiments of the present disclosure.

Referring to FIG. 5, it shows a schematic cross-sectional view of the electronic device 2 according to some embodiments of the present disclosure. In some embodiments, in the optical sensing module 10E, the optical sensing layer 200 overlapping the light-blocking element 400 is not provided with the optical assembly 300. That is, the optical assembly 300 may not dispose on the overlapping portion 200A of the optical sensing layer 200 (i.e. the portion of the plurality of optical sensing elements overlapped the light-blocking element 400). In some embodiments, there is a distance between the edge 200E of the optical sensing layer 200 and the edge 300E of the optical assembly 300, so that the process of forming the optical assembly 300 on the optical sensing layer 200 may be simplified and/or the process cost may be reduced.

As shown in FIG. 5, in some embodiments, there is a second distance d2 between one side edge of the bonding pad 610 and one side edge of the flexible circuit board 600, which reduces the possibility of damage the bonding pads 610 of the flexible circuit board 600 during the cutting process. In some embodiments, the light-blocking element 400, the transmission line 210, the bonding pad 220, the flexible circuit board 600 and the connecting member 230 have an air gap.

Figure 6:
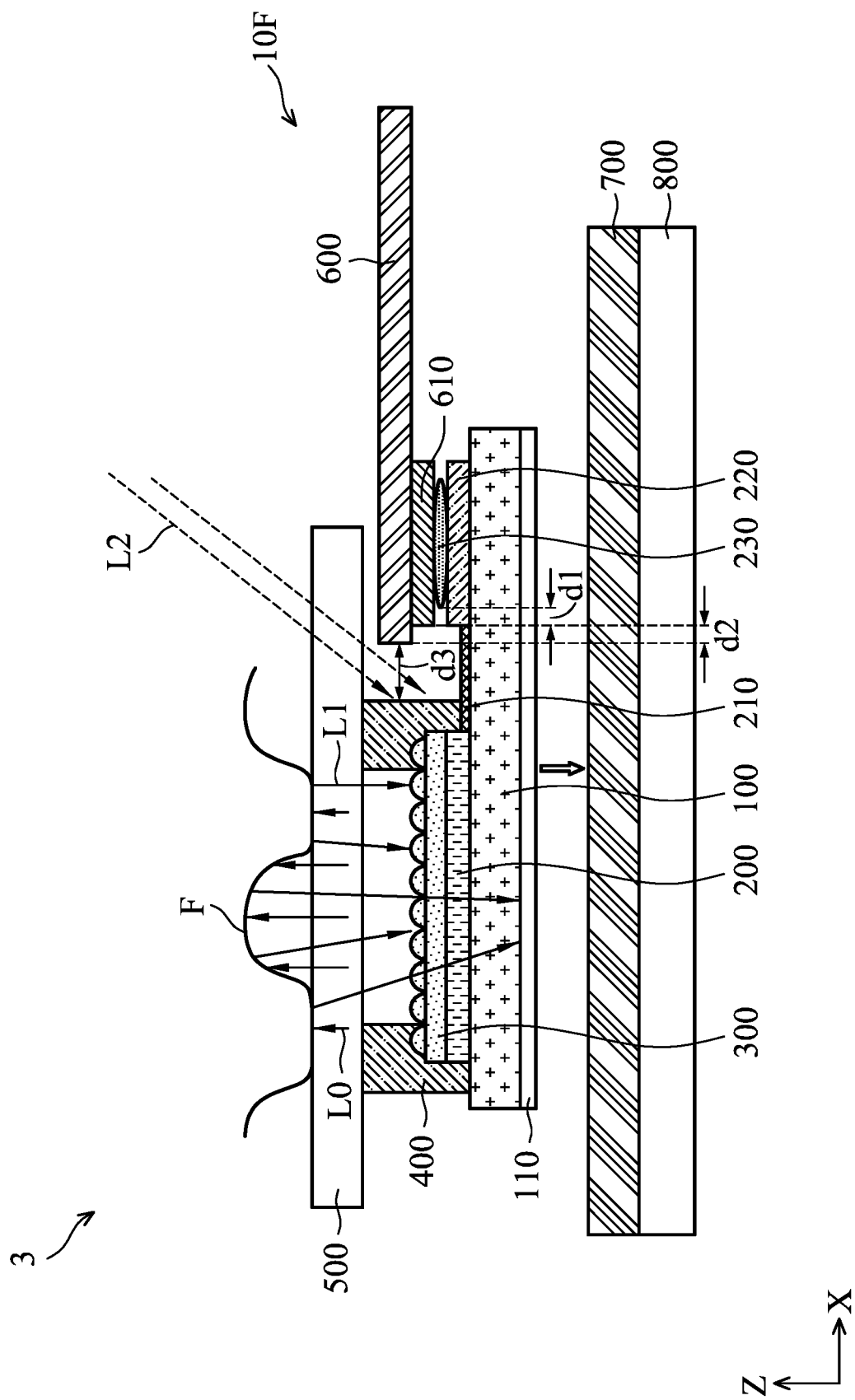
FIG. 6 shows a schematic cross-sectional view of an electronic device according to some embodiments of the present disclosure.

Referring to FIG. 6, it shows a schematic cross-sectional view of the electronic device 3 according to some embodiments of the present disclosure. In some embodiments, the optical sensing module 10F may further include a light absorbing element 110. In some embodiments, the light absorbing element 110 may be disposed on the substrate 100, and the substrate 100 is interposed between the optical sensing layer 200 and the light absorbing element 110. In some embodiments, the light absorption rate of the light absorbing element 110 is greater than 80%. For example, the absorption rate of the light absorbing element 110 is greater than 90%, 95%, 99%, 99.9%, 99.99%, or any value between the aforementioned values, but it is not limited thereto. In some embodiments, the light absorbing element 110 may block the second light L2 reflected or diffracted back and forth between the various components. Therefore, the light absorbing element 110 may further improve the accuracy of the optical sensing layer 200 and/or imaging quality.

In some embodiments, there is a third distance d3 between the flexible circuit board 600 and the light-blocking element 400. The third distance d3 may be greater than the first distance d1 and the second distance d2. Thus, the flexible circuit board 600 has greater process window during the bonding process.

In some embodiments, the electronic device 3 may further include a supporting element 800. The display panel 500 is disposed on one side of the substrate 100, and the supporting element 800 is disposed on the other side of the substrate 100 to provide supporting force to the optical sensing module 10F. In some embodiments, the electronic device 3 may further include a buffer element 700. The buffer element 700 is disposed on the supporting element 800, and the buffer element 700 may be interposed between the substrate 100 and the supporting element 800. In some embodiments, the buffer element 700 is in direct contact with the substrate 100 to reduce the overall thickness of the electronic device 3. The buffer element 700 and the supporting element 800 are disposed on the same side of the substrate 100. In some embodiments, the optical sensing module 10F and the supporting member 800 are connected by the buffer element 700 to fix the relative position of the optical sensing module 10F in the electronic device. In some embodiments, the optical sensing module 10F is disposed on one side of the display panel 500, and the buffer element 700 is also disposed on the aforementioned side of the display panel 500.

In some embodiments, the buffer element 700 may include a material capable of absorbing shock or having elasticity. In some embodiments, the buffer element 700 may include a cushion. In some embodiments, the buffer element 700 itself may include an adhesive material to facilitate connection with the optical sensing module 10F and the supporting element 800. In some embodiments, the buffer element 700 may further include an adhesive layer (not shown), and the buffer element 700 is connected with other components by the adhesive layer. In some embodiments, the adhesive layer may include a photocurable adhesive, a thermally curable adhesive, a photothermally curable adhesive, another suitable material, or a combination thereof, but it is not limited thereto. In some embodiments, the supporting element 800 may include a supportive material. In some embodiments, the support 800 may be a middle frame.

As shown in FIG. 6, in some embodiments, the optical sensing module 10F may be connected to the display panel 500, and then connected to the buffer element 700 and the supporting element 800. Therefore, the process window of connection with the buffer element 700 and the supporting element 800 may be improved.

Figure 7:
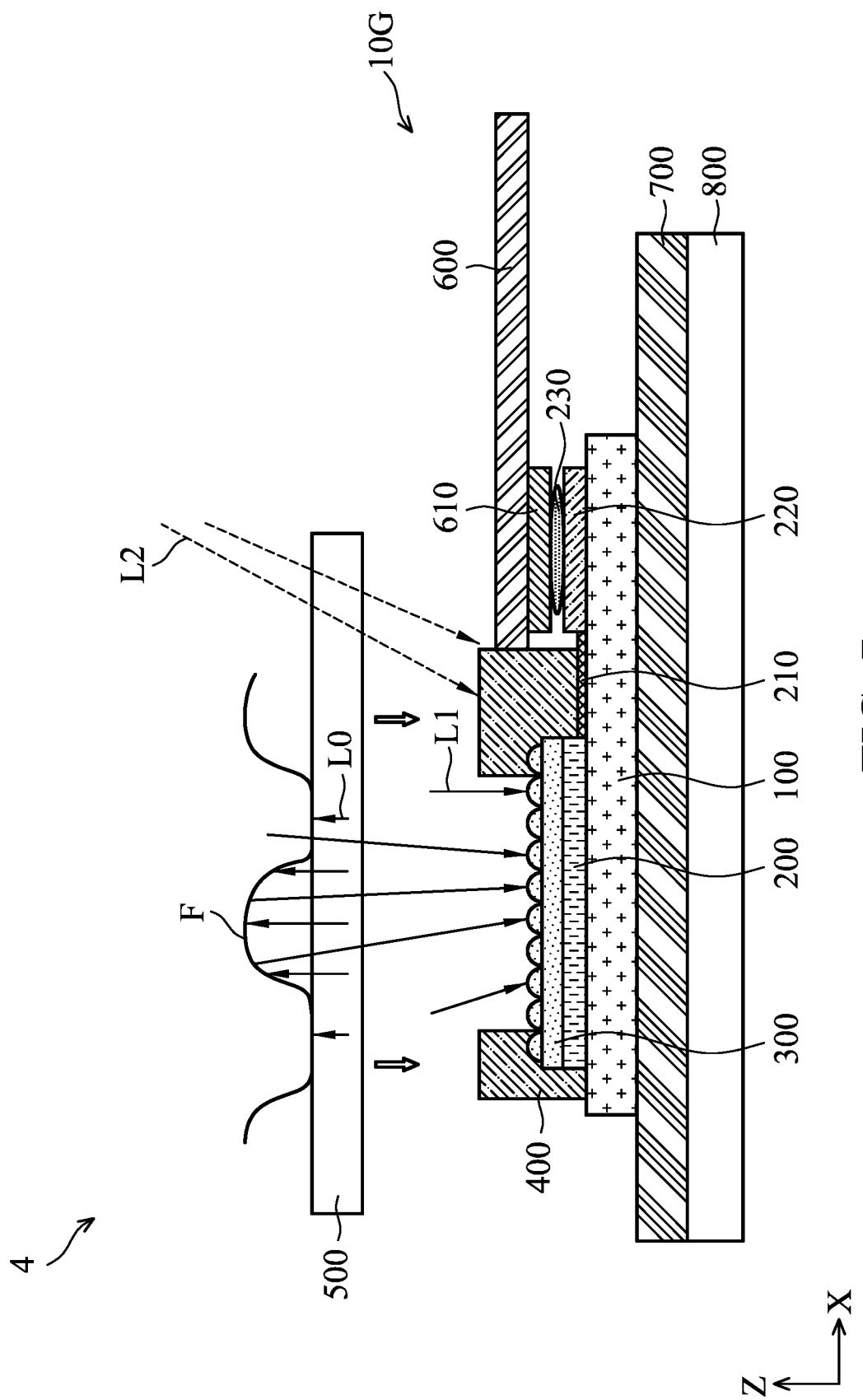
FIG. 7 shows a schematic cross-sectional view of an electronic device according to some embodiments of the present disclosure.

Referring to FIG. 7, it shows a schematic cross-sectional view of the electronic device 4 according to some embodiments of the present disclosure. In some embodiments, the optical sensing module 10G may be connected to the buffer element 700 and the supporting element 800, and then connected to the display panel 500. Therefore, the process window of the connection with the display panel 500 may be improved.

Figure 8:
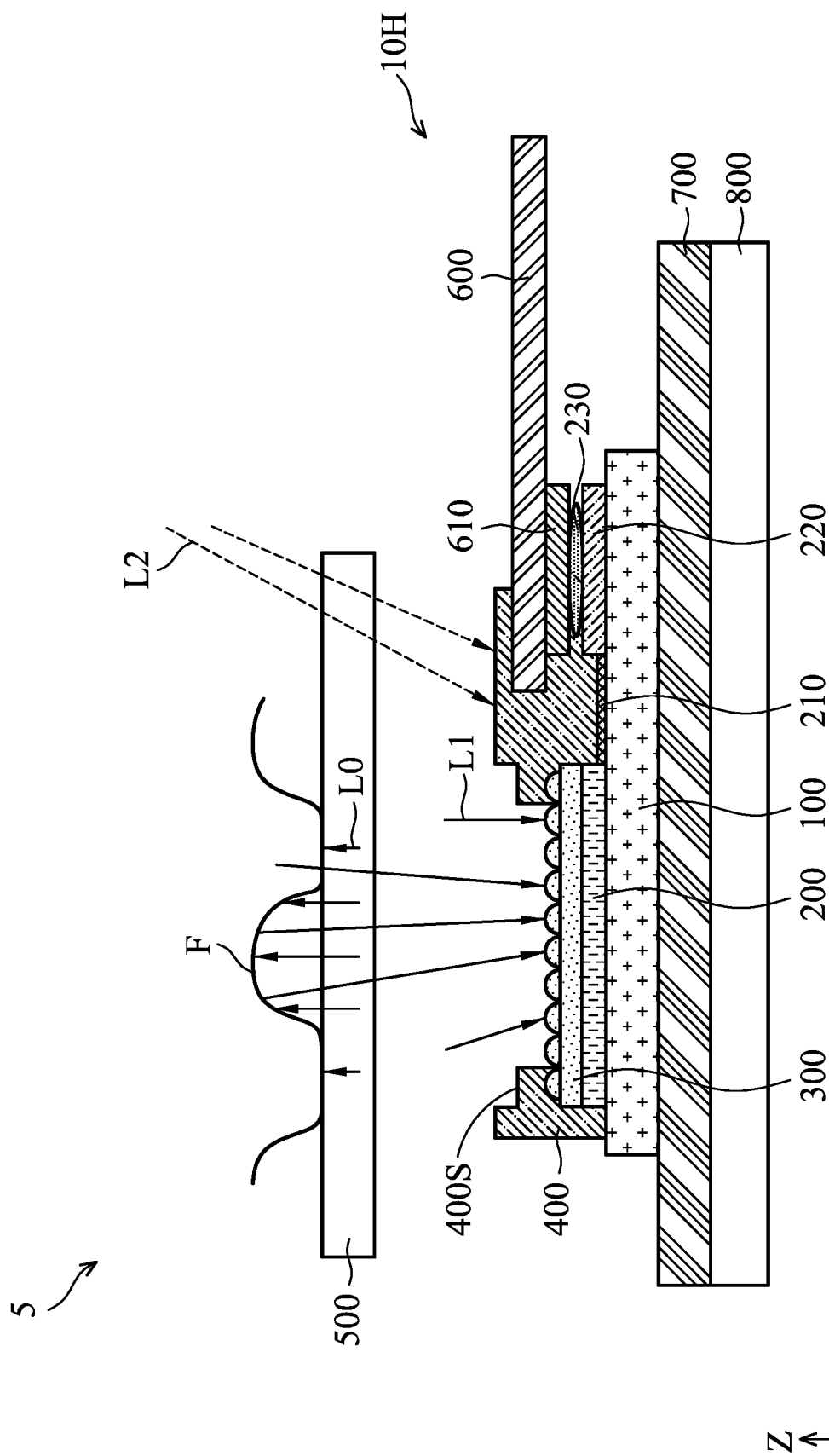
FIG. 8 shows a schematic cross-sectional view of an electronic device according to some embodiments of the present disclosure.

Referring to FIG. 8, it shows a schematic cross-sectional view of the electronic device 5 according to some embodiments of the present disclosure. In some embodiments, in the optical sensing module 10H, the light-blocking element 400 may be disposed on the flexible circuit board 600, and the flexible circuit board 600 is disposed between the light-blocking element 400 and the substrate 100. In some embodiments, the light-blocking element 400 is in direct contact with the bonding pads 220, the connecting members 230, the flexible circuit board 600, and the bonding pads 610.

As shown in FIG. 8, in some embodiments, an inner side surface of the light-blocking element 400 adjacent to the optical sensing layer 200 has a nonlinear side surface 400S. For example, the light-blocking element 400 may have stepped, inclined, and/or curved side surface 400S. In some embodiments, the light-blocking element 400 may have a stepped side surface 400S, and the step height of the stepped side surface 400S is gradually reduced toward (the optical sensing elements 200u of) the optical sensing layer 200. In some embodiments, since the light-blocking element 400 has the stepped side surface 400S, the probability of total reflection of the second light L2 may be reduced, thereby improving the accuracy of the optical sensing layer 200.

Figure 9:
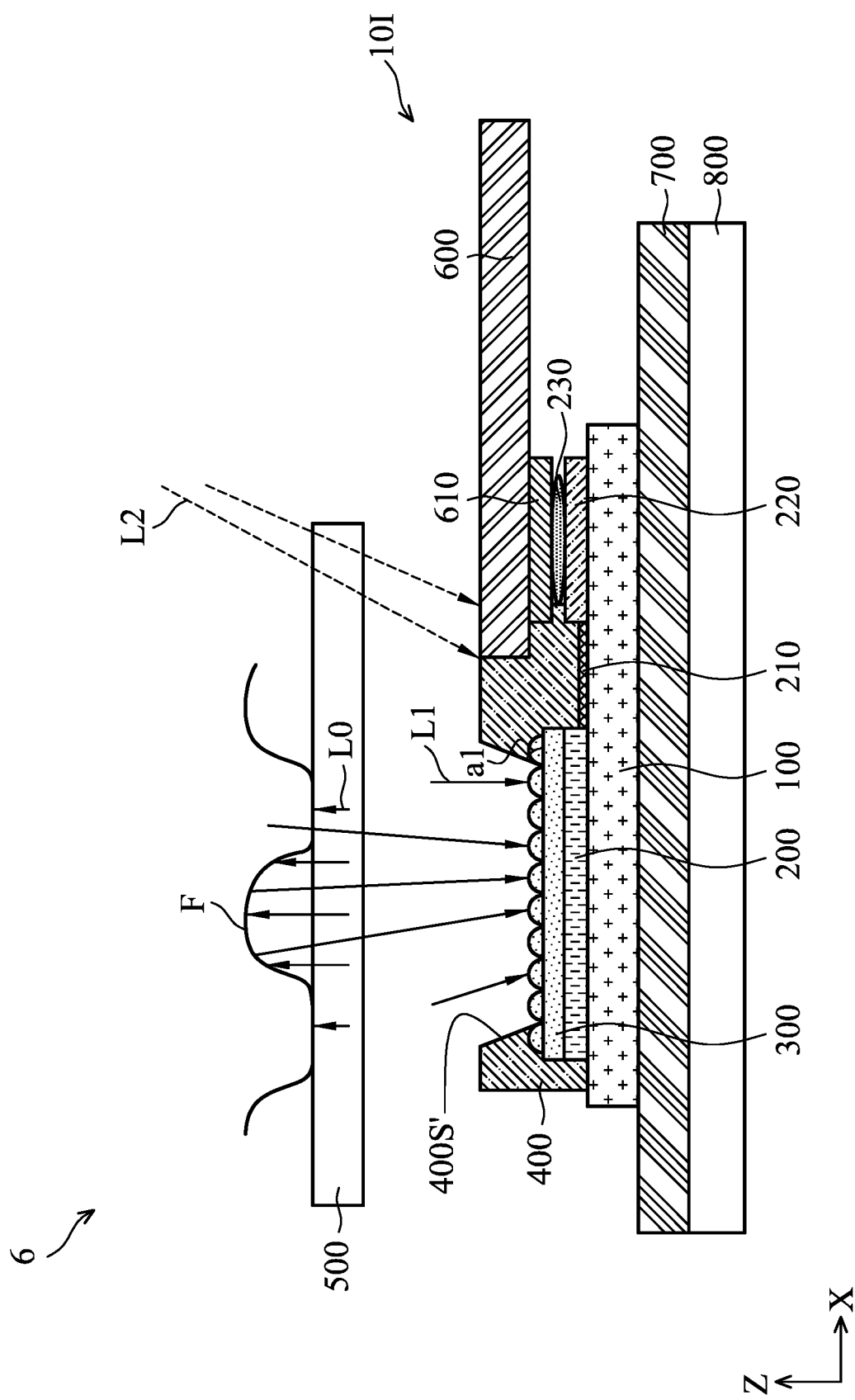
FIG. 9 shows a schematic cross-sectional view of an electronic device according to some embodiments of the present disclosure.

Referring to FIG. 9, it shows a schematic cross-sectional view of the electronic device 6 according to some embodiments of the present disclosure. In some embodiments, in the optical sensing module 10I, the top surface of the light-blocking element 400 is substantially aligned with the top surface of the flexible circuit board 600. In some embodiments, the light-blocking element 400 may have an inclined side surface 400S', so that the probability of total reflection of the second light L2 may be reduced, thereby improving the accuracy of the optical sensing layer 200. In some embodiments, an angle α1 between the inclined side surface 400S of the light-blocking element 400 and the substrate 100 may be between 45 degrees and 80 degrees. For example, the included angle a1 may be 50 degrees, 55 degrees, 60 degrees, 65 degrees, 70 degrees, 75 degrees or any value between the aforementioned values.

Figure 10:
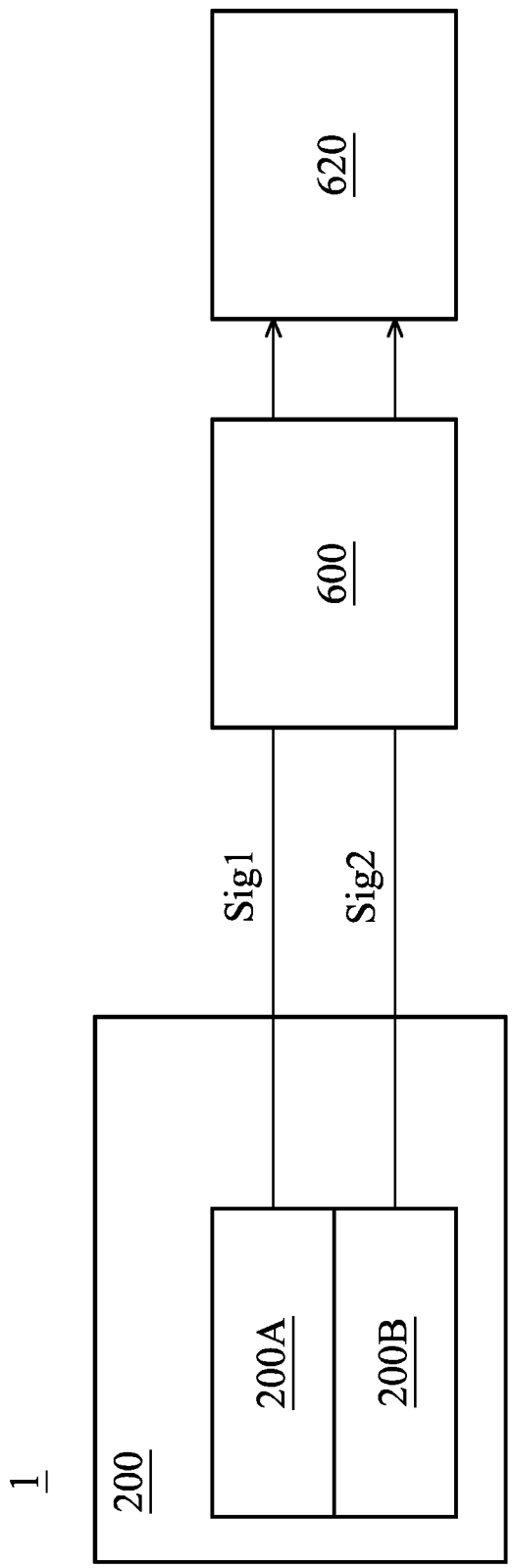
FIG. 10 shows a block diagram of signal processing of an electronic device according to some embodiments of the present disclosure.

Referring to FIG. 10, it shows a block diagram of signal processing of an electronic device 1 according to some embodiments of the present disclosure. It should be noted that the block diagram of the signal processing is described by taking the electronic device 1 including the optical sensing module 10A as an example, but it is not limited thereto.

As shown in FIG. 10, in some embodiments, the optical sensing element 200u in the overlapping portion 200A of the optical sensing layer 200 overlapping the light-blocking element in the normal direction of the substrate provides the first signal Sig1. In some embodiments, the optical sensing element 200u in the non-overlapping portion 200B of the optical sensing layer 200 that does not overlap the light-blocking element in the normal direction of the substrate provides the second signal Sig2. The first signal Sig1 and the second signal Sig2 are transmitted to the flexible circuit board 600 and are transmitted to the processor 620 electrically connected to the flexible circuit board 600. Therefore, the processor 620 may analyze the first signal Sig1 and the second signal Sig2 to obtain the optical signal. For example, the first signal Sig1 is the dark state signal, and the second signal Sig2 is the sum signal of the dark state signal and the light signal, so the processor 620 deducts the first signal Sig1 from the second signal Sig2 to obtain the light signal. In other words, the signal may be corrected by the processor 620.

In summary, according to the embodiments of the present disclosure, an optical sensing module and an electronic device are provided. The interference of the optical sensing element by the second light (for example, an ambient light) may be decreased by disposing the light-blocking element. Thus, the accuracy of sensing the first light or the reliability of electronic devices may be improved. For example, the probability of misjudgment when the optical sensing module and/or the electronic device is applied to fingerprint identification may be reduced.

Although some embodiments of the present disclosure and their advantages have been disclosed above, it should be understood that a person of ordinary skill in the art may change, replace and/or modify the present disclosure without departing from the spirit and scope of the present disclosure. The features between the embodiments of the present disclosure may be arbitrarily combined as long as they do not violate or conflict with the spirit of the disclosure. In addition, the scope of the present disclosure is not limited to the process, machine, manufacturing, material composition, device, method, and step in the specific embodiments described in the specification. A person of ordinary skill in the art will understand current and future process, machine, manufacturing, material composition, device, method, and step from the content disclosed in the present disclosure, as long as the current or future process, machine, manufacturing, material composition, device, method, and step performs substantially the same functions or obtain substantially the same results as the present disclosure. Therefore, the scope of the present disclosure includes the above-mentioned process, machine, manufacturing, material composition, device, method, and steps. The scope of the present disclosure should be determined by the scope of the claims. It is not necessary for any embodiment or claim of the present disclosure to achieve all of the objects, advantages, and/or features disclosed herein.

The foregoing outlines features of several embodiments of the present disclosure, so that a person of ordinary skill in the art may better understand the aspects of the present disclosure. A person of ordinary skill in the art should appreciate that, the present disclosure may be readily used as a basis for designing or modifying other processes and structures for carrying out the same purposes and/or achieving the same advantages of the embodiments introduced herein. A person of ordinary skill in the art should also realize that such equivalent constructions do not depart from the spirit and scope of the present disclosure, and that they may make various changes, substitutions, and alterations herein without departing from the spirit and scope of the present disclosure.

What is claimed is:

1. An optical sensing module, comprising:
   a substrate having a sensing region and a non-sensing region around the sensing region;
   a plurality of optical sensing elements disposed on the sensing region; and
   a light-blocking element disposed on the non-sensing region and a portion of the sensing region,
   wherein the light-blocking element overlaps a portion of the plurality of optical sensing elements in a normal direction of the substrate and the light-blocking element has a nonlinear side surface.

2. The optical sensing module as claimed in claim 1, wherein the light-blocking element is a ring-shaped structure, and the ring-shaped structure forms an opening to expose another portion of the plurality of optical sensing elements.

3. The optical sensing module as claimed in claim 1, further comprising:
   a plurality of bonding pads and a plurality of transmission lines disposed in the non-sensing region,
   wherein the plurality of bonding pads is electrically connected to the plurality of optical sensing elements by the plurality of transmission lines, and the light-blocking element is not disposed on the plurality of transmission lines.

4. The optical sensing module as claimed in claim 1, further comprising:
a plurality of bonding pads and a plurality of transmission lines disposed in the non-sensing region,
wherein the plurality of bonding pads is electrically connected to the plurality of optical sensing elements by the plurality of transmission lines, and the light-blocking element is disposed on the plurality of transmission lines.

5. The optical sensing module as claimed in claim 1, further comprising:
an air gap adjacent to the light-blocking element.

6. The optical sensing module as claimed in claim 1, further comprising:
a flexible circuit board electrically connected to a plurality of bonding pads, wherein a portion of the light-blocking element is disposed on the flexible circuit board.

7. The optical sensing module as claimed in claim 1, further comprising:
a flexible circuit board electrically connected to a plurality of bonding pads, wherein a portion of the flexible circuit board is disposed on the light-blocking element.

8. The optical sensing module as claimed in claim 1, further comprising:
a flexible circuit board electrically connected to a plurality of bonding pads, wherein a distance is between the flexible circuit board and the light-blocking element.

9. The optical sensing module as claimed in claim 1, further comprising:
a flexible circuit board electrically connected to a plurality of bonding pads, wherein the light-blocking element is disposed between the flexible circuit board and the plurality of optical sensing elements.

10. The optical sensing module as claimed in claim 1, wherein the light-blocking element comprises a first light-blocking portion and a second light-blocking portion having different widths.

11. The optical sensing module as claimed in claim 1, further comprising:
an optical assembly disposed on the plurality of optical sensing elements, comprising:
a light collimation structure, and
a microlens disposed on the light collimation structure.

12. The optical sensing module as claimed in claim 11, wherein the optical assembly is not disposed on the portion of the plurality of optical sensing elements overlapped the light-blocking element.

13. The optical sensing module as claimed in claim 1, further comprising:
a light absorbing element disposed on the substrate, wherein the substrate is disposed between the plurality of optical sensing elements and the light absorbing element.

14. The optical sensing module as claimed in claim 1, wherein the light-blocking element has a stepped side surface, and a step height of the stepped side surface is gradually reduced toward the plurality of optical sensing elements.

15. The optical sensing module as claimed in claim 1, wherein the light-blocking element has an inclined side surface, and an angle between the inclined side surface of the light-blocking element and the substrate is between 45 degrees and 80 degrees.

16. The optical sensing module as claimed in claim 1, wherein the portion of the plurality of optical sensing elements that overlaps the light-blocking element has a dark state signal, and a remaining portion of the plurality of optical sensing elements has a combination signal of the dark state signal and a light signal.

17. The optical sensing module as claimed in claim 1, wherein a light absorption rate of the light-blocking element is greater than 80%.

18. An electronic device, comprising:
a display panel; and
an optical sensing module disposed on a side of the display panel, and comprising:
a substrate having a sensing region and a non-sensing region around the sensing region;
a plurality of optical sensing elements disposed on the sensing region; and
a light-blocking element disposed on the non-sensing region and a portion of the sensing region;
wherein the light-blocking element overlaps a portion of the plurality of optical sensing elements in a normal direction of the substrate and the light-blocking element has a nonlinear side surface.

19. The electronic device as claimed in claim 18, further comprising:
a buffer element disposed on the side of the display panel; and
a supporting element disposed on the buffer element, wherein the buffer element is disposed between the substrate and the supporting element.

20. An optical sensing module, comprising:
a substrate having a sensing region and a non-sensing region around the sensing region;
a plurality of optical sensing elements disposed on the sensing region;
a light-blocking element disposed on the non-sensing region and a portion of the sensing region; and
a flexible circuit board electrically connected to a plurality of bonding pads, wherein the light-blocking element is disposed between the flexible circuit board and the plurality of optical sensing elements,
wherein the light-blocking element overlaps a portion of the plurality of optical sensing elements in a normal direction of the substrate.

* * * * *